(12) United States Patent
Henderson et al.

(10) Patent No.: US 6,606,578 B1
(45) Date of Patent: Aug. 12, 2003

(54) SYSTEM AND METHOD FOR ELECTROMAGNETIC PROPULSION FAN

(75) Inventors: J. Kirston Henderson, Fort Worth, TX (US); Boyd B. Bushman, Lewisville, TX (US)

(73) Assignee: Lockheed Martin Corporation, Bethesda, MD (US)

(*) Notice: Subject to any disclaimer, the term of this patent is extended or adjusted under 35 U.S.C. 154(b) by 13 days.

(21) Appl. No.: 09/798,052

(22) Filed: Mar. 1, 2001

(51) Int. Cl.[7] .................. H02K 7/075; H02K 9/04; G01P 3/00
(52) U.S. Cl. .................. 702/145; 148/301; 310/63; 310/81; 318/254
(58) Field of Search .................. 702/142, 144, 702/145; 310/63, 68, 81, 105; 192/84.1; 318/254; 700/164; 433/133

(56) References Cited

U.S. PATENT DOCUMENTS

| | | | | |
|---|---|---|---|---|
| 4,486,176 A | | 12/1984 | Tardieu et al. ............. 433/133 |
| 4,774,440 A | * | 9/1988 | Bhadra ...................... 310/81 |
| 4,926,337 A | * | 5/1990 | Gile ......................... 700/164 |
| 5,075,606 A | * | 12/1991 | Lipman ..................... 318/254 |
| 5,514,926 A | | 5/1996 | Bushman .................... 310/105 |
| 5,616,974 A | * | 4/1997 | Yamada ..................... 310/68 |
| 6,129,193 A | * | 10/2000 | Link ........................ 192/84.1 |
| 6,194,798 B1 | | 2/2001 | Lopatinsky ................. 310/63 |
| 6,388,346 B1 | * | 5/2002 | Lopatinsky et al. .......... 310/63 |
| 2002/0043301 A1 | * | 4/2002 | Walmer et al. .............. 148/301 |

* cited by examiner

*Primary Examiner*—Michael Nghiem
*Assistant Examiner*—John Le
(74) *Attorney, Agent, or Firm*—Baker Botts L.L.P.

(57) ABSTRACT

An electromagnetic propulsion fan includes a hub and a plurality of fan blades coupled to the hub. The electromagnetic propulsion fan also includes a rim coupled to the fan blades such that rotating the rim causes the fan blades to rotate. The rim includes a plurality of magnets coupled thereto. The electromagnetic propulsion fan further includes a plurality of electromagnets in proximity to the rim, the electromagnets controllable to generate magnetic fields that interact with the magnetic fields of the magnets to cause the rim to rotated.

21 Claims, 2 Drawing Sheets

SYSTEM AND METHOD FOR ELECTROMAGNETIC PROPULSION FAN

TECHNICAL FIELD OF THE INVENTION

This invention relates to aerodynamic propulsion devices and, in particular, to propulsion fans.

BACKGROUND OF THE INVENTION

Typically, systems and methods for transferring power from an engine to a propulsion fan of an aircraft employ complicated mechanical linkages, such as bevel gears and mechanical transmission devices. Additionally, the systems and methods typically use some sort of clutch, mechanical or fluid, to engage and disengage the power transfer from the engine to the fan and to implement different gearing ratios.

Unfortunately, using mechanical linkages to transfer power from the engine to the propulsion fan introduces a variety of problems. For example, the mechanical linkages introduce power losses due to friction, slippage, and heat and reliability problems due to mechanical wear. Additionally, it is difficult to smoothly vary the amount of power delivered to the fan from the engine. Furthermore, it is difficult to power a single fan from multiple engines to provide redundancy, in case an engine were to fail. Moreover, it is difficult to shift a fan from a horizontal to a vertical application.

SUMMARY OF THE INVENTION

The present invention substantially reduces or eliminates at least some of the problems and disadvantages associated with previous systems and methods for driving propulsion fans. Accordingly, in particular embodiments, the present invention provides a propulsion fan that has a reduced number of mechanical linkages, a quick response to input commands, and redundancy capability.

An electromagnetic propulsion fan in accordance with certain embodiments of the present invention includes a hub and a plurality of fan blades coupled to the hub. The electromagnetic propulsion fan also includes a rim coupled to the fan blades such that rotating the rim causes the fan blades to rotate. The rim includes a plurality of magnets coupled thereto. The electromagnetic propulsion fan further includes a plurality of electromagnets in proximity to the rim, the electromagnets controllable to generate magnetic fields that interact with the magnetic fields of the magnets to cause the rim to rotate.

A method for controlling an electromagnetic propulsion fan in accordance with the present invention includes generating an instruction specifying the electrical power to be provided to a plurality of electromagnets and detecting a command regarding the rotational speed of a plurality of fan blades. The method also includes determining, if a command is detected, an adjustment to the specified electrical power to achieve the rotational speed of the command and generating a second instruction specifying the adjustment to the specified electrical power.

The present invention provides several technical advantages. For example, the present invention provides a propulsion fan that requires no mechanical linkages to transfer power between the driving elements and the driven elements. Thus, the propulsion fan is not as susceptible to mechanical wear and power loss due to mechanical interactions. Moreover, because no mechanical linkages are required to drive the propulsion fan, the driven elements may be readily engaged with and disengaged from the driving elements. As another example, the present invention provides a propulsion fan having the rotational speed controlled by supplied electrical power. Thus, the operations of the propulsion fan may be varied smoothly, continuously, and/or quickly. Furthermore, because electrical power may be readily varied by a variety of electronic devices, the rotational speed of the propulsion fan may be varied without varying the output from the electrical power generation device. Also because the rotational speed of the propulsion fan is controlled by supplied electrical power, the propulsion fan does not require a transmission to vary the rotational speed. Additionally, providing redundancy, by having the ability to provide the driving elements with electrical power from multiple sources, for example, is simplified. Moreover, it is possible to drive multiple fans from one power source without a complex transmission. As a further example, the present invention provides a propulsion fan that may be slowed and/or reversed without changing the motion of the driving elements or motors, which would likely be electrical generators. Thus, the operations of the propulsion fan may be controlled with a high degree of precision and flexibility. Note that some embodiments of the present invention may possess none, one, some, or all of these technical advantages and/or additional technical advantages.

Other technical advantages will be readily apparent to one skilled in the art from the following figures, description, and claims.

BRIEF DESCRIPTION OF THE DRAWINGS

The following drawings provide a more complete understanding of the present invention, especially when viewed in conjunction with the following detailed description, and also illustrate further features and technical advantages of the present invention.

DETAILED DESCRIPTION OF THE INVENTION

Figure 1:
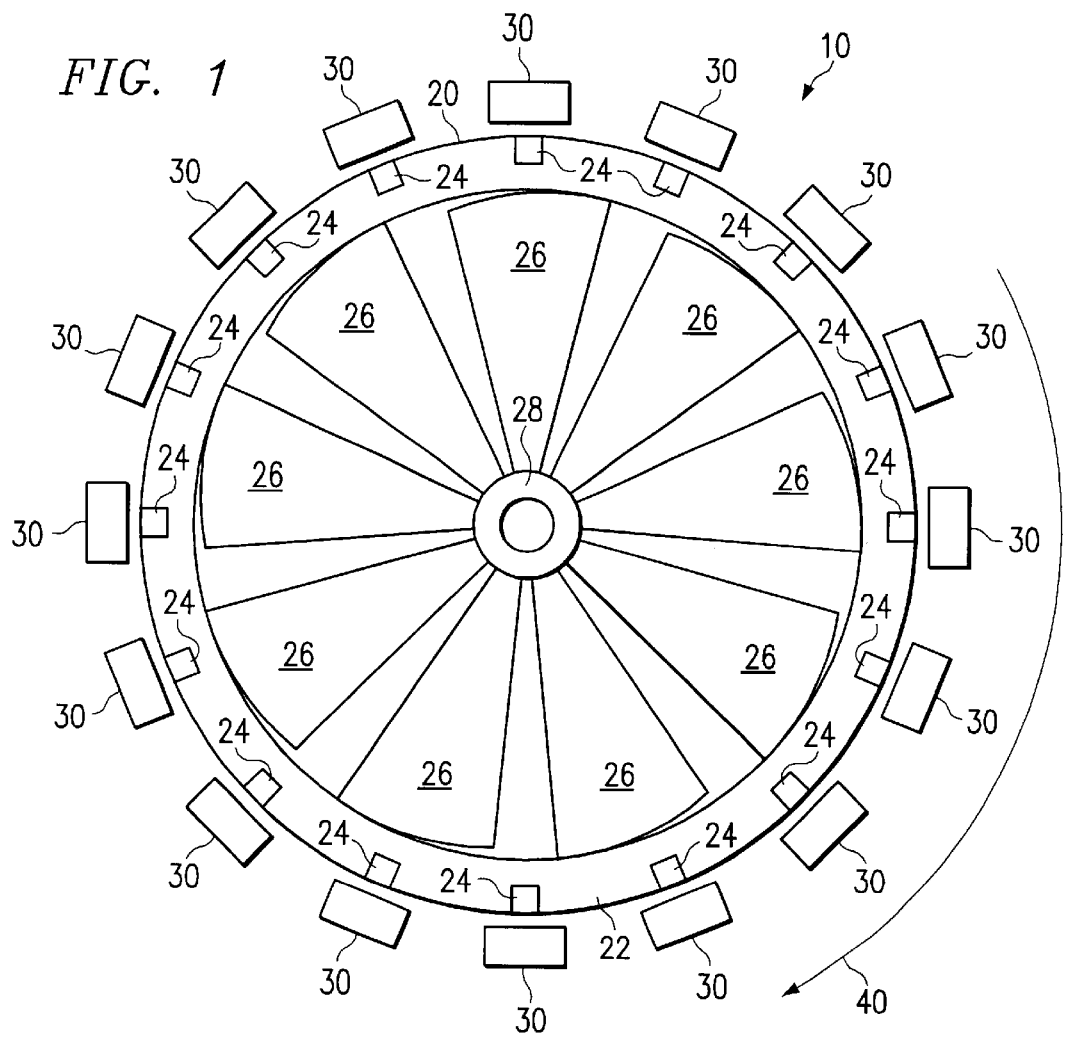
FIG. 1 illustrates one embodiment of an electromagnetic propulsion fan in accordance with the present invention.

FIG. 1 illustrates one embodiment of an electromagnetic propulsion fan 10 in accordance with the present invention. Electromagnetic propulsion fan 10 includes a fan assembly 20, typically mounted in the center of a housing, and a plurality of electromagnets 30, typically mounted to the inner periphery of the housing, in proximity to the outer portions of fan assembly 20. Fan assembly 20 includes a rim 22, a hub 28, and a plurality of fan blades 26, coupled to the rim 22 and the hub 28. Rim 22 includes a plurality of magnets 24 coupled to the periphery thereof.

In operation, by controlling the electrical power provided to electromagnets 30, the electromagnets are controllable to generate magnetic fields when magnets 24 are in the vicinity thereof. The magnetic fields generated by electromagnets 30 may attract and/or repel magnets 24 to cause rim 22 to rotate about hub 28 in the direction of arrow 40. For example, as one of magnets 24 approaches one of electromagnets 30, the electromagnet may generate a magnetic field that attracts the magnet for a period of time, and, as the magnet approaches the next one of the electromagnets 30, that electromagnet may generate a magnetic field that attracts the magnet for a period of time. This attraction of the magnet may continue for each of electromagnets 30. Thus, the electromagnets 30 generate a rotating magnetic field to drive the magnet. Moreover, the electromagnets 30 may be simultaneously driving all of the magnets 24 in a similar manner. Accordingly, by controlling the timing and strength of the magnetic fields generated by the electromagnets 30, the rotational speed of fan assembly 20, and, hence, the amount of thrust produced by the fan assembly 20, may be controlled.

Because the magnetic fields generated by the electromagnets 30 are based on the electrical power provided to the electromagnets, controlling the electrical power provided to the electromagnets controls the magnetic fields, and, hence, the rotational speed of fan assembly 20. By selective control, each of electromagnets 30 may be provided with electrical power each time one of magnets 24 is in a selected position in its vicinity, every other time one of magnets 24 is in a selected position in its vicinity, every time a specific one of magnets 24 is in a selected position in its vicinity, or at any other time that one of magnets 24 is in a selected position in its vicinity. The amount of electrical power provided to the electromagnets 30 will depend on the size of, the configuration of, and the amount of thrust to be produced by fan assembly 20, and is readily ascertainable by one skilled in the art.

Note that by adjusting the electrical power provided to electromagnets 30, the rotation of the fan assembly 20 may be slowed and/or reversed. This may be accomplished by, for example, providing electrical power to the electromagnets so that they attract magnets 24 as magnets 24 begin to depart the vicinity of the electromagnets. Additionally, this may be accomplished by providing electrical power to the electromagnets 30 so that they repel magnets 24 as magnets 24 begin to enter the vicinity the electromagnets. A variety of other examples exist. This ability allows for accurate control of the rotational speed of electromagnetic propulsion fan 10 and provides versatility for electromagnetic propulsion fan 10, because it may generate thrust in two directions; moreover, this ability is available without the use of complex gearboxes and mechanical drives.

The components of electromagnetic propulsion fan 10 may be formed of a variety of materials, may have a variety of configurations, and may be arranged in a variety of manners. Rim 22 of fan assembly 20 may be composed of aluminum, brass, composite, plastic, or any other type of non-magnetic material. Rim 22 may have any of a variety of configurations that will support magnets 24 and withstand the forces applied by electromagnets 30. In particular embodiments, rim 22 may be rotatably supported about its outer periphery to the support structure for electromagnets 30. Magnets 24 of rim 22 may be NdFeB magnets or any other type of permanent magnets. Magnets 24 may be adhered to, bonded to, embedded in, molded with, or otherwise coupled to an appropriate portion of rim 22. Fan blades 26 and hub 28 may be composed of aluminum, composite, brass, plastic, or any other appropriate type of material. Fan blades 26 and hub 28 may be composed of aluminum, composite, brass, plastic, or any other appropriate type of material. Fan blades 26 may be adhered to, bonded to, welded to, molded with, or otherwise coupled, directly or indirectly, to rim 22 and hub 28 and may have any of a variety of configurations for developing a thrust force by the movement of air. Hub 28 may have any of a variety of configurations for supporting fan blades 26 and may be mounted to a bearing, to a shaft mounted to a bearing, or to any other type of device that will also fan blades 26 to rotate about hub 28. Note that in particular embodiments, hub 28 may merely couple the inner ends of fan blades 26 together, such as, for example, when rim 22 is rotatably coupled about its outer periphery to the support structure for electromagnets 30. Electromagnets 30 may be composed of conducting wires, such as, for example, copper or aluminum, wrapped around iron cores or any other type of material that creates a magnetic field when provided with electrical power. Electromagnets 30 may be located in the plane with rim 22, above rim 22, below rim 22, or in any other position around fan assembly 20 to enable the generated magnetic fields to interact with the magnetic fields of magnets 24 to cause fan assembly 20 to rotate. Electromagnets 30 are typically located between approximately one-tenth of an inch to one-fourth of an inch from the outer periphery of rim 22, but may be located at any distance to enable the generated magnetic fields to interact with the magnetic fields of magnets 24 to drive fan assembly 20. Note that the number of magnets 24 does not have to be equal to the number of electromagnets 30. A variety of other materials, configurations, and arrangements well know to those skilled in the art may also be used.

electromagnetic propulsion fan 10 has a variety of technical advantages. For example, no mechanical gearing is needed to couple the power from the driving devices, electromagnets 30, to the driven devices, magnets 24. Thus, the system is not as susceptible to wear and power loss due to friction and slippage between gears and is lighter in weight than typical systems for transferring power to a propulsion fan, which are significant benefits in aircraft applications. Moreover, the fan assembly 20 may be readily engaged with and disengaged from electromagnets 30 without the use of a clutch. As another example, the amount of power used to drive the fan assembly 20 is based on the amount of electrical power supplied to the electromagnets 30. Thus, because electrical power may be varied quickly, smoothly, and/or continuously, the speed of or power transferred to fan assembly 20 is quite flexible. Moreover, because electrical power can be readily supplied from different sources, redundant electrical power may be provided to electromagnets 30. A variety of other technical advantages will be readily suggested to those skilled in the art.

Electromagnetic propulsion fan 10 is considered to be useful for vertical take-off and landing (VTOL) aircraft. In such an application, electromagnets 30 would probably be mounted around the inner periphery of a generally circular structure having an air passage, such as, for example, a cowling or a nozzle, and fan assembly 20 would probably be mounted in the center of the air passage of the structure. Thus, as electromagnets 30 attracted and/or repelled magnets 24 to cause rim 22 to rotate, fan blades 26 would pull air into the passageway. The air could then be appropriately exhausted to provide horizontal and/or vertical thrust. In a particular embodiment, the structure is mounted on a single axis gimbal so that fan assembly 20 is rotatable between vertical and horizontal orientations, for horizontal and vertical thrust applications, respectively. The mechanical simplicity of the power transfer between the driving elements and the driven elements makes this capability quite feasible. Note, electromagnetic propulsion fan 10 may have a variety of other uses for an aircraft, such as, for example, to provide yaw control or pitch control.

Figure 2:
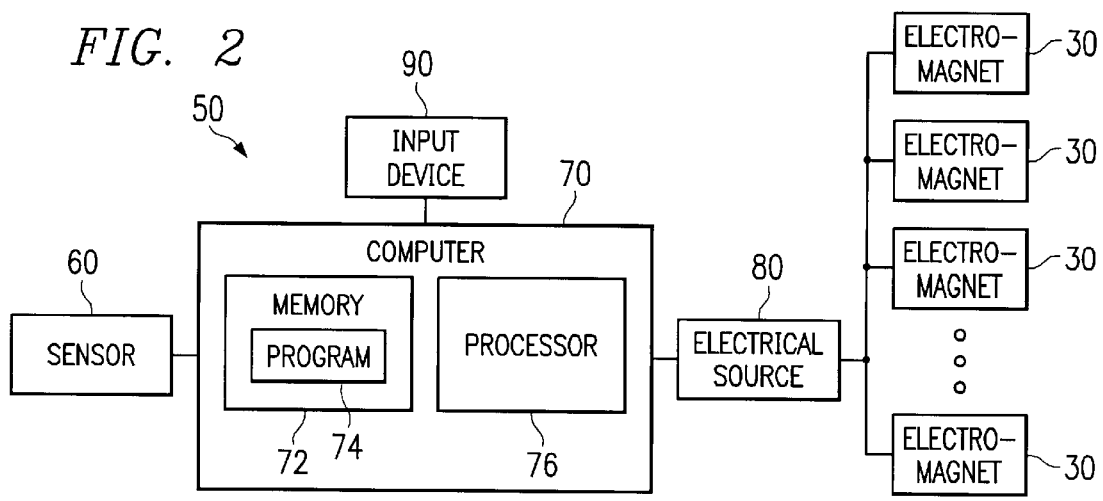
FIG. 2 illustrates one embodiment of a control system for the electromagnetic propulsion fan of FIG. 1.

FIG. 2 illustrates one embodiment of a control system 50 for electromagnets 30, and hence electromagnetic propulsion fan 10. Control system 50 includes a sensor 60, a computer 70, an electrical source 80, and an input device 90.

Sensor 60 is coupled to computer 70 and operates to make detections regarding the position of the rim 22. Input device 90 is also coupled to computer 70 and operates to receive input commands regarding the rotational speed of fan assembly 20. Computer 70 includes a memory 72, having a program 74, and a processor 76. Computer 70 operates to respond to inputs from sensor 60 and/or input device 90 to compute whether and/or how to adjust the electrical power provided to electromagnets 30. Electrical source 80 is coupled to computer 70 and operates to provide the electrical power specified by computer 70 to electromagnets 30. Note that an "adjustment" may be a modification to the currently specified electrical power or a specification of an entirely new electrical power.

In one mode of operation, sensor 60 detects detectable portions of rim 22, such as, for example, the magnets 24, and generates signals related thereto. Based on these generated signals, computer 70, according to logical instructions in program 74, computes the rotational speed of fan assembly 20 and, hence, the period of time when magnets 24 will be in the vicinity of electromagnets 30. By determining when magnets 24 will be in the vicinity of the electromagnets 30, computer 70 may instruct electrical source 80 when to provide electrical power to electromagnets 30 to cause fan assembly 20 to rotate. As discussed previously, the electrical power supplied to electromagnets 30 by electrical source 80 may attract and/or repel magnets 24. For example, computer 70 may determine when the magnets 24 will be departing the vicinity of electromagnets 30 and instruct electrical source 80 to provide electrical power to electromagnets 30 that will generate a magnetic field to repel magnets 24 at that time. This repulsion will push magnets 24 away from electromagnets 30 and, hence, drive rim 22 and fan blades 26. The time at which the magnetic fields should be generated may be adjusted as needed.

In another mode of operation, input device 90 receives commands regarding the rotational speed of fan assembly 20, such as, for example, to increase thrust. Upon receiving such a command, input device 90 communicates the command to computer 70. Based on this command, processor 76 determines an adjustment to the electrical power provided to electromagnets 30 and instructs electrical source 80 to adjust the electrical power provided to electromagnets 30 accordingly. For example, input device 90 may receive a command, from a throttle or attitude control system, for example, to decrease the rotational speed of fan assembly 20, thereby decreasing the thrust provided by electromagnetic propulsion fan 10. Then, computer 70 could determine that the amount of electrical power provided to electromagnets 30 should be reduced, because reducing the amount of electrical power provided to electromagnets 30 will reduce the strength of the magnetic fields of electromagnets 30, and hence the torque applied to fan assembly 20. Of course, as mentioned previously, computer 70 could decide to instruct electrical source 80 to provide electrical power that will retard the rotation of fan assembly 20, by varying the timing of the electrical power, for example.

Note that it is not only the strength of the magnetic fields of electromagnets 30, and, therefore, the amount of electrical power provided thereto, that causes magnets 24 to move, but also the amount of time that the electromagnets 30 are generating the magnetic fields. For example, if one of magnets 24 is in the vicinity of one of electromagnets 30 for a given period of time, and if the electromagnet is only generating a magnetic field for one-tenth of that period of time, the electromagnet is not transferring all of the potential impulse to the magnet. Accordingly, by increasing the time the magnetic field is active, and, hence, the time that electrical power is provided to the electromagnet, the magnet may receive more impulse from the electromagnet. Conversely, of course, by having the electromagnet produce a magnetic field for a shorter period of time, less impulse may be imparted to the magnet. Note further that the electromagnets 30 should generate the magnetic fields at the appropriate time to have their proper effect. For example, if the electromagnets 30 generate their magnetic fields when the magnets 24 are far away, the magnetic fields may be too weak to interact appropriately with the magnets 24.

In another mode of operation, computer 70 may maintain the rotational speed of fan assembly 20 within a given range of a desired rotational speed, such as, for example, plus or minus five percent. To accomplish this, computer 70 determines the current rotational speed of fan assembly 20 based on the detections by sensor 60 and compares this to the desired speed for fan assembly 20, which compute 70 may have previously determined or have been provided. If the current rotational speed of fan assembly 20 is not within a range of the desired rotational speed, computer 70 may determine an adjustment to the electrical power provided to electromagnets 30. Computer 70 may then generate an instruction specifying the adjustment to the electrical power provided to the electromagnets 30 and send this instruction to electrical source 80. Electrical source 80 may then implement the adjustment to the electrical power provided to electromagnets 30.

The components of control system 50 may have a variety of configurations. Sensor 60 may be an optical sensor, a magnetic field sensor, or any other type of device that can make detections regarding the position of rim 22. In a particular embodiment, sensor 60 is an optical sensor that detects the passage of each of magnets 24. Computer 70 may be a reduced instruction set computer (RISC), a complex instruction set computer (CISC), an application specific integrated circuit (ASIC), or any other type of device for manipulating information. Memory 72 may be random access memory (RAM), compact disk read-only memory (CD-ROM), registers, or any other type of volatile or non-volatile magnetic or optical device for storing information. Program 74 may reside in memory 72 and/or be encoded in processor 76. Input device 90 may be a control device, such as, for example, a throttle, an output of a control system, such as, for example, a roll control system, or any other type of device that generates a single regarding the rotational speed of fan assembly 20. Electrical source 80 may be an electric generator or any other type of device for generating electrical power. Note that electrical source 80 may have any of a variety of processing capabilities, such as, for example, being able to receive an instruction and provide appropriate electrical power to electromagnets 30 based on the instruction until a new instruction is received or having to be instructed each time electrical power is to be provided to electromagnets 30. Sensor 60, input device 90, and electrical source 80, may be coupled to computer 70 by wires, fiber optic cables, wireless channels, or any other type of links that will allow information to be exchanged between the components. A variety of other configurations will be readily suggested to those skilled in the art.

Additionally, the components of control system 50 may be arranged in a variety of manners. For example, computer 70 may be a part of electrical source 80. As another example, computer 70 may be an attitude controller for an aircraft and input device 90 could be an associated sensor, such as, for example, a gyroscope or accelerometer. As a further example, a variety of components, such as, for example, amplifiers, filters, and/or computers, could be located between the components. As an additional example, electrical source 80 may be a plurality of electrical sources controlled by computer 70, each electrical source responsible for a subset of electromagnets 30. Furthermore, a plurality of electrical sources such as electrical source 80 could be used to provide electrical power to electromagnets 30, thereby providing redundancy. A variety of other arrangements are well known to those skilled in the art.

Figure 3:
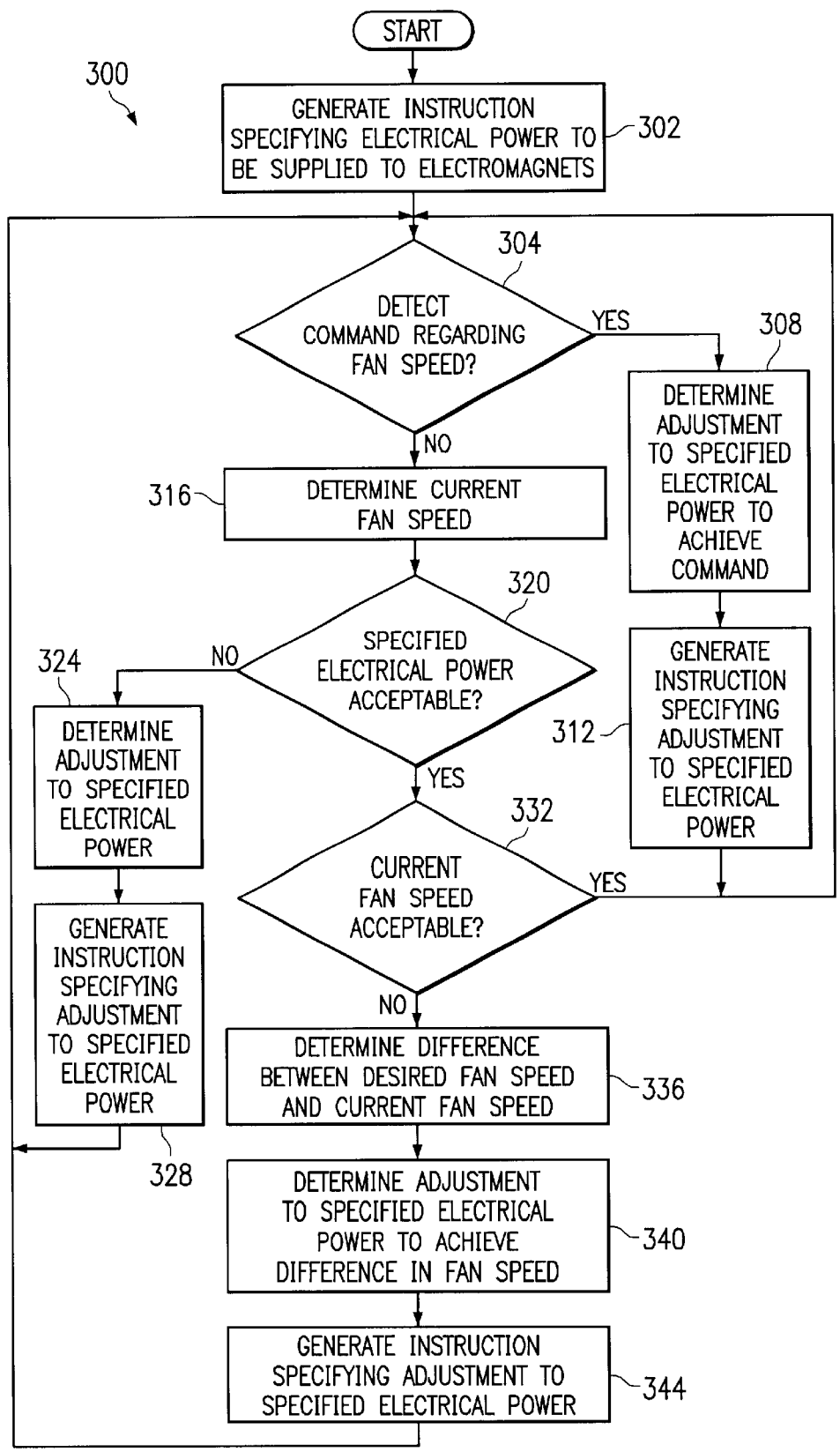
FIG. 3 is a flowchart illustrating one embodiment of a method of operation for the electromagnetic propulsion fan of FIG. 1.

FIG. 3 is a flowchart 300 illustrating one method of operation for an electromagnetic propulsion fan, such as, for example, electromagnetic propulsion fan 20, in accordance with the present invention. At function block 302, the method comprises generating an instruction specifying the electrical power to be supplied to the electromagnets, such as, for example, electromagnets 30. As discussed previously, specifying the electrical power to be supplied to the electromagnets may include the time at which the electrical power is to be supplied, the amount of electrical power to be supplied, the duration that the electrical power is to be supplied, and/or any other suitable electrical parameter. At decision block 304, the method comprises determining whether a command regarding the rotational speed of the fan assembly, such as, for example, fan assembly 20, has been detected. This command could be to set the rotational speed at a specific rate, to increase the current rotational speed by a specified amount, to set the thrust to a certain level, or any other appropriate type of command relating to the rotational speed of a fan assembly.

If such a command has been detected, the method comprises determining an adjustment to the specified electrical power to achieve the rotational speed dictated by the command at function block 308. The adjustment may be to the time at which the electrical power is to be supplied, the amount of electrical power to be supplied, the duration that the electrical power is to be supplied, and/or any other suitable electrical parameter. Then, at function block 312, the method comprises generating an instruction specifying the adjustment to the specified electrical power. The instruction is subsequently sent to the electrical source, such as, for example, electrical source 80, and the method returns to decision block 304.

When no command has been detected regarding the rotational speed of the fan assembly at decision block 304, the method comprises determining the current rotational speed of the fan assembly at function block 316. At decision block 320, the method comprises determining whether the specified electrical power is acceptable. The specified electrical power may be unacceptable, for example, if the electromagnets are not generating the magnetic fields at the appropriate time. If the specified electrical power is unacceptable, the method comprises determining an adjustment to the specified electrical power at function block 324. At function block 328, the method comprises generating an instruction specifying the adjustment to the specified electrical power. The instruction is subsequently sent to the electrical source, and the method returns to decision block 304.

If, however, the specified electrical power is acceptable at decision block 320, the method comprises determining whether the current rotational speed of the fan assembly is acceptable at decision block 332. If the current rotational speed is acceptable, the method returns to decision block 304. On the other hand, if the current rotational speed is unacceptable, the method comprises determining the difference between the desired rotational speed, which may, for example, have been determined previously by computer or provided by another device, and the current rotational speed at function block 336. The method also comprises determining an adjustment to the specified electrical power to achieve the difference in rotational speed at function block 340 and generating an instruction specifying the adjustment to the specified electrical power at function block 344. The instruction is subsequently sent to the electrical source, and the method returns to decision block 304.

Although flowchart 300 illustrates a variety of operations for an electromagnetic propulsion fan in accordance with the present invention, other methods of operating an electromagnetic propulsion fan in accordance with the present invention may include none, one, some, or all of these operations and/or additional operations. Additionally, the operations may occur in different orders. For example, the operation of maintaining the rotational speed of the fan assembly within a given range of the desired rotational speed may not be performed. As another example, the amount of thrust being generated by the electromagnetic propulsion fan may be calculated and used to determine whether to adjust the specified electrical power. As a further example, determining whether the specified electrical power is acceptable may occur before determining whether a command regarding the rotational speed of the fan blades has been detected. A variety of other operations and their consequent ordering will be readily suggested to those skilled in the art.

Although several embodiments of the invention have been illustrated and described, numerous other embodiments may readily be suggested to one skilled in the art through additions, deletions, alterations, and/or substitutions to the described embodiments. It is intended that the scope of the appended claims cover such additions, deletions, alterations, and/or substitutions.

What is claimed is:

1. An electromagnetic propulsion fan, comprising:

a hub;

a plurality of fan blades coupled to the hub;

a rim coupled to the fan blades such that rotating the rim causes the fan blades to rotate, the rim including a plurality of magnets coupled thereto;

a plurality of electromagnets in proximity to the rim, the electromagnets controllable to generate magnetic fields that interact with the magnetic fields of the magnets to cause the rim to rotate;

an electrical source coupled to the electromagnets, the electrical source operable to controllably provide electrical power to the electromagnets, the electrical power facilitating the generation of the magnetic fields of the electromagnets;

a sensor operable to make detections that facilitate determining the angular position of the rim at various times; and a computer coupled to the sensor and the electrical source, the computer, based on the detections by the sensor, operable to instruct the electrical source when to provide electrical power to the electromagnets.

2. The propulsion fan of claim 1, wherein the magnets comprise NdFeB magnets.

3. The propulsion fan of claim 1, wherein the hub, fan blades, and rim comprise aluminum.

4. The propulsion fan of claim 1, wherein each electromagnet comprises copper wire wrapped around an iron core.

5. The propulsion fan of claim 1, wherein the magnetic fields generated by each electromagnet attract a magnet when in the vicinity thereof to cause the rim to rotate.

6. The propulsion fan of claim 1, wherein the computer further operates to instruct the electrical source as to the duration and amount of electrical power to provide to the electromagnets.

7. The propulsion fan of claim 1, wherein the sensor comprises an optical sensor operable to detect the magnets.

8. The propulsion fan of claim 1, wherein the computer further operates to determine the rotational speed of the fan blades based on the detections by the sensor.

9. The propulsion fan of claim 8, wherein the computer further operates to instruct the electrical source to adjust the electrical power provided to the electromagnets if the rotational speed is not within a given range of a desired rotational speed.

10. The propulsion fan of claim 9, wherein the computer instructs the electrical source to provide electrical power for a longer period of time to instruct the electrical source to adjust the electrical power.

11. The propulsion fan of claim 1, wherein the computer further operates to detect a command regarding the rotational speed of the fan blades and, in response, instruct the electrical source to adjust the electrical power provided to the electromagnets.

12. An electromagnetic propulsion fan, comprising:
a hub;
a plurality of fan blades having a first end and a second end, the first end of each fan blade coupled to the hub;
a rim coupled to the second end of each fan blade such that rotating the rim causes the fan blades to rotate, the rim including a plurality of magnets coupled thereto;
a plurality of electromagnets in proximity to the rim, the electromagnets controllable to generate magnetic fields that interact with the magnetic fields of the magnets to cause the rim to rotate;
an electrical source coupled to the electromagnets, the electrical source operable to controllably provide electrical power to the electromagnets, the electrical power facilitating the generation of the magnetic fields of the electromagnets;
a sensor operable to make detections that facilitate determining the angular position of the rim at various times; and
a computer coupled to the sensor and the electrical source, the computer, based on the detections by the sensor, operable to determine the rotational speed of the fan blades and instruct the electrical source when to provide a determined amount of electrical power for a determined amount of time to the electromagnets.

13. The propulsion fan of claim 12, wherein the magnets comprise NdFeB magnets.

14. The propulsion fan of claim 12, wherein the magnetic fields generated by each electromagnet attract a magnet when in the vicinity thereof to cause the rim to rotate.

15. The propulsion fan of claim 12, wherein the computer further operates to instruct the electrical source to adjust the electrical power provided to the electromagnets if the rotational speed of the fan blades is not within a given range of a desired rotational speed.

16. The propulsion fan of claim 12, wherein the computer further operates to detect a command regarding the rotational speed of the fan blades and, in response, instruct the electrical source to adjust the electrical power provided to the electromagnets.

17. An electromagnetic propulsion fan, comprising:
a hub;
a plurality of fan blades coupled to the hub;
a rim coupled to the fan blades such that rotating the rim causes the fan blades to rotate, the rim including a plurality of magnets coupled thereto;
a plurality of electromagnets in proximity to the rim, the electromagnets operable to generate magnetic fields that interact with the magnetic fields of the magnets in order to cause the rim to rotate; and
a computer operable to control the magnetic fields of the electromagnets in order to affect rotation of the rim, wherein controlling the electromagnets comprises specifying one or more time intervals when the electromagnets are to generate the magnetic fields.

18. An electromagnetic propulsion fan, comprising:
a hub;
a plurality of fan blades coupled to the hub;
a rim coupled to the fan blades such that rotating the rim causes the fan blades to rotate, the rim including a plurality of magnets coupled thereto;
a plurality of electromagnets in proximity to the rim, the electromagnets operable to generate magnetic fields that interact with the magnetic fields of the magnets in order to cause the rim to rotate; and
a computer operable to control the magnetic fields of the electromagnets in order to affect rotation of the rim, wherein controlling the electromagnets comprises specifying strength and duration parameters associated with the magnetic fields of the electromagnets.

19. An electromagnetic propulsion fan, comprising:
a hub;
a plurality of fan blades coupled to the hub;
a rim coupled to the fan blades such that rotating the rim causes the fan blades to rotate, the rim including a plurality of magnets coupled thereto;
a plurality of electromagnets in proximity to the rim, the electromagnets operable to generate magnetic fields that interact with the magnetic fields of the magnets in order to cause the rim to rotate; and
a computer operable to control the magnetic fields of the electromagnets in order to affect rotation of the rim, wherein the computer is further operable to detect a command relating to a rotational speed of the fan blades and, in response to the command, adjust one or more of the magnetic fields of the electromagnets.

20. An electromagnetic propulsion fan, comprising:
a hub;
a plurality of fan blades coupled to the hub;
a rim coupled to the fan blades such that rotating the rim causes the fan blades to rotate, the rim including a plurality of magnets coupled thereto;
a plurality of electromagnets in proximity to the rim, the electromagnets operable to generate magnetic fields that interact with the magnetic fields of the magnets in order to cause the rim to rotate;
a computer operable to control the magnetic fields of the electromagnets in order to affect rotation of the rim;
an electrical source coupled to the electromagnets, the electrical source operable to selectively provide electrical power to the electromagnets, the electrical power facilitating the generation of the magnetic fields of the electromagnets; and
a sensor operable to make detections that facilitate determining an angular position of the rim at various times, wherein the computer is coupled to the sensor and the electrical source and, based on the detections by the sensor, operable to control the electrical power provided to the electromagnets.

21. The propulsion fan of claim 20, wherein the computer is further operable to control duration and amount parameters associated with electrical power provided by the electrical source to the electromagnets.

* * * * *